(12) United States Patent
Proulx et al.

(10) Patent No.: US 6,180,080 B1
(45) Date of Patent: *Jan. 30, 2001

(54) REMOVAL OF THIOSULFATE FROM STRETFORD SOLUTION WITH HYDROGEN PEROXIDE

(75) Inventors: Christopher R. Proulx, Piscataway; Marioara V. Ionila, Wayne, both of NJ (US)

(73) Assignee: Degussa Corporation, Ridgefield Park, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/855,988

(22) Filed: May 14, 1997

(51) Int. Cl.$^7$ ............... C01B 17/02; C02F 1/72; C22B 17/96
(52) U.S. Cl. ............... 423/576.6; 210/759; 423/544
(58) Field of Search ............... 423/575, 576.5, 423/576.6, 544, 226; 210/721, 759

(56) References Cited

U.S. PATENT DOCUMENTS

| | | | |
|---|---|---|---|
| 3,959,452 | * 5/1976 | Espenscheild | 423/226 |
| 3,972,989 | * 8/1976 | Fenton et al. | 423/571 |
| 4,049,776 | 9/1977 | Nicklin | 423/226 |
| 4,083,945 | 4/1978 | Fenton et al. | 423/573 |
| 4,360,508 | * 11/1982 | Farrington et al. | 423/226 |
| 4,364,918 | * 12/1982 | Espenscheid | 423/573 R |
| 4,367,212 | * 1/1983 | Castrantas | 423/573 R |
| 4,393,037 | 7/1983 | Delaney | 423/573 |
| 4,511,544 | 4/1985 | Connell et al. | 423/224 |
| 4,541,998 | 9/1985 | Weber | 423/226 |
| 4,569,769 | * 2/1986 | Walton et al. | 210/759 |
| 4,769,228 | 9/1988 | Romoda et al. | 423/573 |
| 5,360,552 | 11/1994 | Yan | 210/762 |
| 5,380,442 | * 1/1995 | Yan | 210/721 |
| 5,536,297 | 7/1996 | Marchbank et al. | 75/736 |

* cited by examiner

Primary Examiner—Gary P. Straub
(74) Attorney, Agent, or Firm—Smith, Gambrell & Russell LLP

(57) ABSTRACT

A process for the removal of thiosulphate from spent Stretford solution, The process comprises adjusting the spent Stretford solution to an acidic pH, preferably in the range of 1 to 3, and adding a peroxygen compound. The process allows the user to recycle spent Stretford solution in a cost effective manner by taking advantage of previously unknown buffering properties in the solution.

12 Claims, No Drawings

REMOVAL OF THIOSULFATE FROM STRETFORD SOLUTION WITH HYDROGEN PEROXIDE

BACKGROUND AND INTRODUCTION

The present invention relates to a process for the removal of thiosulfate ion ($S_2O_3^{2-}$) from Stretford solution. More particularly, the process of the present invention utilizes hydrogen peroxide or other peroxygen compounds at acidic pH for reaction with the thiosulfate ion in the Stretford solution.

The so-called "Stretford Process" removes hydrogen sulfide from natural and process gases by oxidizing the sulfide ion to elemental sulfur with air, vanadium (V) salts and anthraquinone disulfonates.

Stretford solution is always kept on the alkaline side. In the alkaline range, the solution absorbs the sour gas or tail gas (hydrogen sulfide) and converts it to sulfur by the use of the catalyst.

The term "Stretford solution" is used to define a catalytic solution containing alkali vanadates and anthraquinone catalysts. Petrochemical facilities and natural gas processing facilities which process large amounts of hydrogen sulfide containing gasses pass these gasses into the Stretford system to react with air and cause the sulfide to be oxidized to sulfur. This sulfur is then separated from the Stretford solution and sold for use in a variety of chemical processes.

During this process a portion of the sulfide is instead converted to thiosulfate and sulfate. This occurs, according the report by Trofee, T. W., et al., Stretford Process Operations and Chemistry Report: Final Report, prepared by Radian Corporation, Austin, Tex. for the Gas Research Institute GRI93/0129, Ill.; November, 1993; pages 2–to 2–16 by the reaction of oxygen with polysulfide ($S_n^{2-}$) at alkaline pH, to form thiosulfate, ($S_2O_3^{2-}$) and, also by the reaction of sulfur, at alkaline pH. Sulfate also is a by-product of the oxidation of the sulfide to sulfur.

Thiosulfate accumulates in the solution to a higher concentration than sulfate. Different facilities determine the maximum tolerance for thiosulfate in their Stretford reactor in different ways, such as increased chemical consumption and costs due to the need to remove a portion of the contaminated catalyst solution and replacing it with fresh catalyst solution (blowdown), high blowdown disposal costs, poor solubility of the catalysts in the contaminated Stretford solution when a high level of thiosulfate is present, poor removal of sulfide from the gas handling stream due to poor catalyst performance, and also higher corrosivity of the solution on the tanks and working parts of the reactor. In any case, when the concentration of thiosulfate reaches between 150 to 400 g/l as sodium thiosulfate pentahydrate, the solution is spent and needs to be replaced.

In the past this outcome resulted in the necessity of disposing of the spent solution. In some cases it is possible to simply dump this solution into a landfill by absorbing it onto fly ash and sealing in steel drums. This is a less viable option in recent years than it was in the past because of increasing environmental regulations. Disposing of this material in this way is a burden to the landfill, the community and the source of the product for many years to come. The source, or party generating the waste, is forever responsible for the environmental harm that may come from that material. In fact, in California, this material is classified as a hazardous waste.

It is possible to ship the spent solution to an off-site facility for chemical processing to oxidize the thiosulfate and recover the vanadium for reprocessing. This is becoming more difficult as well due to the reluctance of facilities to accept this material.

Both of the above disposal options result in loss, at least in part, of the valuable catalyst components that are present in the Stretford solution, meaning that fresh solution must be made up to continue the process. This represents additional reagent and manpower costs for the operating facility.

Another option is to desalt the spent Stretford solution using a commercial process that removes the thiosulfate and sulfate as elemental sulfur and Glauber's salt ($Na_2SO_4 \cdot 10H_2O$). This process is at least as expensive as disposing of Stretford solution by the above methods costing about $0.78–$0.85 per gallon.

It is therefore an object of the present invention to find a way of treating the spent Stretford solution to remove the thiosulfate therefrom in an efficient and technically superior manner.

Another object of the invention is to avoid disposal problems that have arisen with prior methods of treating spent Stretford solutions.

In the past, there have been studies using hydrogen peroxide to oxidize thiosulfate in petrochemical and mining wastes, but none have used the reaction conditions of this invention and none have produced the large amounts of marketable sulfur that this process produces. In both cases, the products described in the reaction are sulfate and polythionate or polysulfide rather than sulfur.

In an article, Redox Chemistry of $H_2S$ Oxidation by the British Gas Stretford Process Part IV: V—S—$H_2O$ Thermodynamics and Aqueous Vanadium (V) Reduction in Alkaline Solutions, by Kelsall, Thompson and Francis, *Journal of Applied Electrochemistry*, 23 (1993), 417–426, the authors even go so far as to describe the reaction of hydrogen peroxide with various vanadate species but do not describe the effect of adding hydrogen peroxide under the conditions used in this invention.

SUMMARY OF THE INVENTION

In achieving the above and other objects, the present invention relates to a process for removal of thiosulfate from spent Stretford solution by the use of hydrogen peroxide or another peroxygen chemical capable of releasing hydrogen peroxide to treat the Stretford solution with the resulting production of sulfur in significant quantity as a marketable product. A feature of the process of the invention is careful control of the pH of the Stretford solution before peroxide addition.

In one variation, the process comprises a method for removing thiosulfate from spent Stretford solution by adjusting the pH of the Stretford solution to an acidic pH, preferably to a pH from 0 to 5, and most preferably to a pH from 1 to 3. It is to be noted that there is a particular pH from 1.5 to 2 which is especially important due to the presence of a buffering effect in this range. When the pH is adjusted to approximately 1.7, the amount of acid required is not as great as when operating at substantially different pH conditions, i.e., when operating below 1.5 or above 2. At this pH value of 1.7, the reaction of the hydrogen peroxide with the thiosulfate has particularly good efficiency. If the pH is adjusted to approximately 1.6 or below, the amount of acid required is much higher, and subsequently the amount of caustic required to return the solution to an alkaline pH is much higher, resulting in significantly higher costs when operated on a commercial scale.

In another variation of the above process, air can be bubbled into the spent Stretford solution when the pH is lowered to the acidic range.

DETAILED DESCRIPTION OF THE INVENTION

We have found that hydrogen peroxide can quickly and cost effectively remove thiosulfate from spent Stretford solution and enable the Stretford solution to continue to be used. This not only saves the cost of disposal but also saves the cost of making new Stretford solution. The process results in the production of sulfur which can be handled by the existing sulfur handling equipment. The process of the invention is economical because it saves the cost of buying new catalyst and it reduces or even eliminates the cost of disposing of used Stretford solution. Saving is achieved by eliminating the paperwork cost of preparing wastes for off-site disposal and the liability of tracking this waste through off-site treatment companies.

According to the more detailed aspects of the invention, careful control is maintained over the pH of the Stretford solution and thereby enabling the obtaining of the intended results. More specifically, the pH is adjusted as needed to an acidic pH of less than 5, preferably from 1 to 3, and most preferably from 1.5 to 2.

When the reaction is carried out taking into consideration these ranges of pH, the pH does not become more acidic as predicted in the literature. That is, though the reaction is begun at a pH from 1.5 to 2, at the end of the reaction the pH has stayed the same or may even have risen slightly. This results in a savings in the cost of an alkaline reagent that would be required for neutralization to pH 7 or above before further handling is carried out versus if the pH is lowered to below 1.5. When starting at this pH range, the reaction causes the pH to drop further resulting in a higher caustic requirement to bring it back to a neutral or alkaline pH.

Moreover, we have noted that the spent Stretford solution can be treated to a low level of thiosulfate and be used again, that is, the saturation of the solution with thiosulfate does not require that the solution be disposed of any longer. The thiosulfate can be removed to any level desired by following the procedures described herein for the addition of hydrogen peroxide and then the treated Stretford solution can be recycled and continued to be used in the Stretford reactor for the removal of sulfide from waste gasses.

Moreover, this process can even allow the user to recycle old Stretford solutions that are waiting for disposal and use these solutions for reuse of the catalysts that are contained in them, thereby saving the cost of adding new vanadium and anthraquinone to the Stretford reactor over a period time. This may be as simple as pumping the old Stretford solutions into the existing reactor with peroxide while lowering the pH to the range described.

In carrying out the process of this invention, it is envisioned that one embodiment would involve the lowering of the pH of the spent Stretford solution to the acidic range as described above by adding a suitable inorganic or organic acid and then introducing the hydrogen peroxide or source of hydrogen peroxide.

In another embodiment, air would also be bubbled into the acidified spent Stretford solution to work in combination with the hydrogen peroxide, either simultaneously or sequentially.

According to a variation, under selected conditions determined on an experimental basis, air could be introduced without the hydrogen peroxide.

In the end, one can envision a dual process Stretford reactor where air and peroxide are added concurrently, depending on the composition in the reactor. When the reactor is operating normally, air is used to generate the anthraquinone disulfonates but, when needed, the pH of the reactor would be lowered and peroxide added to oxidize accumulated thiosulfate thereby regenerating the Stretford solution and normal operation can be resumed.

The purpose of the process of the invention is to remove thiosulfate from a working Stretford solution in the most efficient way possible.

It has been recently found that the pH of the starting reaction is very critical to the efficiency of the reaction and the acidity of the end product, and, therefore, the amount of caustic needed to bring the solution back to a pH of 8.

Further, it has been found that the pH should be below 2 to remove thiosulfate most efficiently. However between 1 and 2 another change takes place. If the reaction is started at or below pH 1.4, the peroxide efficiency is very good but the pH drops further during the reaction and the amount of caustic required for neutralization rises. It is still quite economical however compared to the current means of disposal. However, if the reaction is started between 1.4 and 1.7, the peroxide requirement is still quite low and the pH may actually rise during the reaction making the resulting caustic amount needed for neutralization even less. If the starting pH is above 2.5, the reaction efficiency drops off sharply.

Due to the components in the Stretford solution, the solution is strongly buffered from pH 1.6 to 2.0. This is an excellent pH range, since it would require a considerable amount of concentrated sulfuric acid to lower the pH below pH 1.6. Therefore treating spent Stretford solution in the pH range of 1.6 to 2.0 results in very good savings in acid costs and allows for very efficient use of peroxide.

Other suitable inorganic or organic acids can be used such as hydrochloric, nitric, phosphoric, acetic, formic and proplonic acids.

There is also a temperature effect. Generally, as the temperature of the reaction is raised, the conversion efficiency to sulfur rises, and the final thiosulfate concentration falls. This is noted in Example 1–3 herein. In fact, the reaction is exothermic. When the temperature is allowed to rise during the reaction, better reaction efficiency results.

The present invention will be further understood with reference to the following examples.

EXAMPLES

Examples 1–5 pH Effect

Volume of treatment 50 ml. Starting concentration of sulfate 400 g/l.

| Example | Start pH | Conc. Sulfuric acid added | pH at end of reaction (cold) | Thio-sulfate remaining g/l | NaOH 40% required to neutralize to 7 |
|---|---|---|---|---|---|
| 1 | 1.18 | 3.6 ml | 0.55 | 19.96 | 5.2 ml |
| 2 | 1.45 | 2.9 | 1.47 | 26.56 | 2.5 |
| 3 | 1.72 | 2.0 | 1.77 | 34 | 1.1 |
| 4 | 1.93 | 1.5 | 2.34 | 81.31 | 0.6 |
| 5 | 2.0 | 1.4 | 2.62 | 90.65 | 0.5 |

Explanation

Examples 1 to 5 show the optimization of the starting pH. example 1, 3.6 ml of sulfuric acid was needed to lower the to 1.18. Then, after the treatment with hydrogen peroxide, 5.2 ml of caustic soda was needed to raise the pH to 7. This process required a fairly large amount of sulfuric acid and caustic soda. The larger the quantities of sulfuric acid and caustic soda that are used to regenerate Stretford solution, less economical the process. In example 5, only 1.4 ml of sulfuric acid was needed to lower the pH to 2.0, and only 0.5 ml of caustic soda was needed to raise the pH to 7. This process was, therefore, much more economical than the process in example 1.

The resulting difference in thiosulfate concentration in each case is not significant on a commercial scale and can be adjusted by adding additional hydrogen peroxide if necessary. All of the above treatments had the same amount of peroxide added. Although at a pH of 1.18 more thiosulfate is removed than at a pH of 2.0, the difference between 90.65 and 19.96 g/l is not very important when considering the initial concentration of thiosulfate, which was 400 g/l. Probably the optimum would be the treatment at pH 1.72. This used 2.0 ml acid and, 1.1 ml of caustic while only 34 g/l thiosulfate remained.

In each of the above examples, 6 g of $H_2O_2$ 50% was used and at least 75% of the original thiosulfate was removed. Example 3, however, appeared to be the most cost effective treatment. By adding 4% (by volume) of concentrated sulfuric acid to the spent Stretford solution, which lowered the pH to 1.72, nearly 92% of the thiosulfate was removed, and only 2.2% (by volume) of the 40% caustic soda solution was required to raise the pH to 7.

Examples 6–8

Temperature Effect

Example 6

50 ml of Stretford solution containing 392 g/l of sodium thiosulfate, 20.1 g/l of sulfate and 73 g/l of polythionates ($S_3O^{2-}_6$, $S_4O^{2-}_6$, etc.) other than thiosulfate (all measured as thiosulfate), was treated by adjusting the pH to 2.1 with 1.3 ml concentrated sulfuric acid and adding 6 g. of hydrogen peroxide 50% at 55° C. The thiosulfate concentration was lowered to 128 g/l while 72.3 g/l of sulfur was produced. The polythionates measured 264.1 g/l (all measured as thiosulfate). Therefore 67.3% of the thiosulfate was removed while 45.7% of the thiosulfate was converted to sulfur.

Example 7

50 ml of the same Stretford solution as above was adjusted to pH 2.1 with 1.3 ml of sulfuric acid. It was then treated with 6 g. of hydrogen peroxide 50% at a pH of 2.1 and at 65° C. The thiosulfate concentration was lowered to 51.1 g/l while 85.31 g/l thiosulfate was converted to sulfur, 75.78 g/l of thiosulfate was oxidized to sulfate and the remainder (206.6 g/l) was changed to polythionates. This accounted for 86.3% of the starting thiosulfate. The process converted 21.7% of the thiosulfate to sulfur and removed 87% of the thiosulfate.

Example 8

50 ml of the same Stretford solution as above was adjusted to a pH of 2.1 with sulfuric acid and treated with 6 g. of hydrogen peroxide 50% at 75° C. Only 48.2 g/l of thiosulfate was remaining after the reaction, 130.9 g/l of the thiosulfate was converted to sulfur, 78 g/l was oxidized to sulfate, and 223.1 g/l was converted to polythionates (all measured as thiosulfate). This treatment removed 87.7% of the starting thiosulfate and converted 83.4% of the thiosulfate to sulfur.

Example 9

50 ml of a Stretford solution containing 375 g/l thiosulfate was adjusted with sulfuric acid to a pH below 1. It was treated with 3.29 g. of hydrogen peroxide 50% at ambient temperature. The resulting thiosulfate concentration was 57.33 g/l but only a small amount of sulfur resulted. Most of the thiosulfate had been oxidized to sulfate. There was an additional drop in the pH, which required a large amount of caustic soda to neutralize the solution.

Example 10

50 ml of a Stretford solution containing 375 g/l thiosulfate was treated with 6.15 g peroxymonosulfuric acid or Caro's acid without pH adjustment. The thiosulfate was reduced to 6.21 g/l, resulting in 98.3% thiosulfate removal. The Caro's acid caused the pH to drop below 1. However, due to the low pH of the reaction in this and in the previous example, sulfur was not a significant product. Instead, sulfate was the product of the reaction. Because of the very low pH, much higher caustic amounts would be required to raise the pH to neutral or an alkaline pH than in the examples 1 through 8.

Summary of All Treatments

The pH of the reaction was crucial to obtaining the best results. The efficiency is measured in the highest removal of thiosulfate at the lowest peroxide, acid and caustic cost. Also the highest production of sulfur is desirable because it removes sulfur compounds from the system as a solid which is a technical advantage. This provides more capacity for absorption of additional sulfide from the refinery processes. The conversion of the thiosulfate to polythionates and sulfate still allows for continued use of the Stretford solution, but at a lower efficiency than total removal as sulfur.

The temperature of the reaction was important to the efficiency of the reaction. When testing between 30 and 80° C., the higher the temperature of the reaction, the higher the amount of thiosulfate that was converted to sulfur, and the lower the amount of thiosulfate converted to polythionates. The process can be performed between 20 and 110° C., preferably 40 to 80° C. and most preferably 60 to 80° C.

This treatment provides for the treatment of the Stretford solution for less than it costs for disposal. This treatment also saves the cost of replacing the solution with new solution. This is a sharp reduction in the cost of running the Stretford process, and can increase the efficiency of the sulfur unit.

Further variations and modifications of the foregoing will be apparent to those skilled in the art and are intended to be encompassed by the claims appended hereto.

What is claimed is:

1. A process for removing thiosulfate from Stretford solution and recovering sulfur therefrom consisting essentially of:

reducing the pH of said solution to within a range of about 1 to 3 by adding an acid, and then adding a peroxygen compound to said solution at a temperature of 20 to 110° C., while maintaining said pH, and converting thiosulfate to sulfur.

2. The process according to claim 1, in which the pH of said solution is reduced to a pH in the range from 1.5 to 2.

3. The process according to claim 1, in which the pH of said solution is reduced to a pH in the range from 1.6 to 1.8.

4. The process according to claim 1, wherein the temperature is between 60 to 80° C. inclusively.

5. The process according to claim 1, wherein the temperature of the solution is allowed to rise as a result of an exothermic reaction between the solution and peroxygen compound.

6. The process according to claim 1, wherein the peroxygen compound added to said solution is hydrogen peroxide.

7. The process according to claim 1, wherein the acid is selected from the group consisting of sulfuric acid, hydrochloric acid, nitric acid, phosphoric acid, acetic acid, formic acid, and propionic acid.

8. A process for removing thiosulfate from spent Stretford solution and recovering sulfur therefrom consisting essentially of reducing the pH of said solution to a pH in the range of from 1.6 to 2.0 by adding an acid to attain a buffered condition in said solution and adding a peroxygen compound to said solution at a temperature of 20 to 110° C. and thereafter adding caustic soda to neutralize said solution and to convert thiosulfate to sulfur.

9. The process according to claim 8, and further comprising bubbling air into acidified spent Stretford solution.

10. A process for removing thiosulfate from spent Stretford solution and recovering solid sulfur therefrom consisting essentially of reacting said solution with an acid and a peroxygen compound, controlling the pH of the reaction by beginning the reaction at a pH in the range of 1.4 to 1.7 by adding an acid to attain a buffered condition in said solution and adding a peroxygen compound to said solution at a temperature of 20 to 110° C. sufficient to convert thiosulfate to sulfur, neutralizing said solution and recovering solid sulfur.

11. The process according to claim 10, and further comprising bubbling air into acidified spent Stretford solution.

12. A process for removing thiosulfate from spent Stretford solution and recovering sulfur therefrom consisting essentially of:

reacting said Stretford solution with an acid and a peroxygen compound by beginning the reaction by adding to said solution an amount of concentrated sulfuric acid to obtain a pH of from 1.18 to 2.0, adding hydrogen peroxide to said solution at a temperature of 20 to 110° IC, adding caustic soda to raise the pH to 7, and recovering the sulfur.

* * * * *